United States Patent [19]
Brockmann

[11] Patent Number: 6,028,413
[45] Date of Patent: Feb. 22, 2000

[54] CHARGING DEVICE FOR BATTERIES IN A MOBILE ELECTRICAL DEVICE

[75] Inventor: Hans-Jürgen Brockmann, Muurla, Finland

[73] Assignee: Perdix Oy, Helsinki, Finland

[21] Appl. No.: 09/156,467

[22] Filed: Sep. 18, 1998

[30] Foreign Application Priority Data

Sep. 19, 1997 [DE] Germany ............................ 197 41 279
Aug. 12, 1998 [DE] Germany ............................ 198 36 401

[51] Int. Cl.[7] ............................ H02J 7/00; H02M 3/335; G01R 27/28
[52] U.S. Cl. ......................... 320/108; 324/654; 324/657; 363/22
[58] Field of Search .............................. 320/108; 363/18, 363/22; 324/654, 655, 656, 657

[56] References Cited

U.S. PATENT DOCUMENTS 5,654,621  8/1997  Seelig ...................................... 320/108
5,923,544  7/1999  Urano ....................................... 363/22

FOREIGN PATENT DOCUMENTS

| 0293874 | of 0000 | European Pat. Off. . |
| 0589911 | of 0000 | European Pat. Off. . |
| 0589912 | of 0000 | European Pat. Off. . |
| 0298707 | 1/1989 | European Pat. Off. . |
| 7-123707 | 5/1995 | Japan . |
| 2291291 | 1/1996 | United Kingdom . |
| 97-042695 | 11/1997 | WIPO . |

OTHER PUBLICATIONS

Lucking, Werner: Who steht die Leistungselektronik Heute? In: Technische Rundschau 14/85, S. 100–105.
Tietze, U. Schenk, Ch. Halbleiter–Schaltungs–technik, Springer–Verlag, Berlin U.A. 1985 7. Aufl., S.446–447.
JP Patent Abstracts of Japan: 60–70973 A., E–338, Aug. 24, 1985, vol. 9, No. 208; 0631.

*Primary Examiner*—Peter S. Wong
*Assistant Examiner*—Gregory J. Toatley, Jr.
*Attorney, Agent, or Firm*—Ware, Fressola, Van der Sluys & Adolphson LLP

[57] ABSTRACT

A device for charging batteries is comprised of a mobile electrical device MD and a charging unit CU and inductively transmits electrical power by means of a alternating magnetic field from at least one primary winding W1, W2 to at least one secondary winding W3, W4 in the mobile device MD. According to the invention, the alternating magnetic field is generated by a self-oscillating push-pull oscillator which contains switches Q1, Q2 that are reciprocally connected with positive feedback and in each push-pull branch, contains a resonance circuit with the effective inductance of at least one primary winding W1 or W2 and with a circuit capacitance C1, C3 or C2, C4, wherein the primary windings W1 and W2 in the charging unit CU are disposed spatially separate from each other so that each generates a magnetic alternating field in a different spatial region and the secondary windings W3, W4 in the mobile device are disposed so that each spatial region is equally loaded.

15 Claims, 4 Drawing Sheets

CHARGING DEVICE FOR BATTERIES IN A MOBILE ELECTRICAL DEVICE

TECHNICAL FIELD

The invention relates to a charging device for charging batteries in a mobile electrical device, for example a radiotelephone, a cordless telephone, or the like, in which the energy is inductively transmitted from a charging device to the mobile device coupled by a alternating magnetic field. The charging device detects when no energy for charging is being drawn on the secondary side or when in lieu of the mobile electrical device, a foreign body is drawing energy from the alternating magnetic field and then switches automatically back into a low-power standby mode.

BACKGROUND OF THE INVENTION

The continuing development in the field of mobile radio technology has led to particularly compact and light mobile radiotelephone, so-called "mobile phones", and cordless telephones that are operated by batteries with high energy density. In the interests of a high degree of mobility and a continuous use, batteries of this kind must have a high capacitance and must be rechargeable in an extremely short time by means of public network energy or the on-board voltage of a vehicle. Since the batteries should also already have sufficient energy for the transmitting operation after a short charge time, an extremely light and compact charging unit is necessary, which for so-called quick charges supplies a relatively large amount of charging energy into the mobile device. Due to the compactness of mobile radiotelephones, the charging energy must be as lossfree as possible and must be conveyed to the battery with a minimum of control means in the phone device, i.e. the charging unit must at least have a current limitation. In the interests of reliability and comfort, the mobile device is advantageously intended to be coupled to the charging unit without electrical contacts. For a continuous reachability by incoming calls, the device must additionally be ready to receive even during charging. The charging unit is not permitted to influence the function of the connected mobile radio device, as is possible, for example, due to electromagnetically radiated interference from the harmonic waves of the switching pulses and can only be prevented in conventional switching converters by means of costly filters and shields.

The requirements mentioned are fulfilled particularly well by charging units which contain a DC converter wired with L-C-resonance circuits, since these converters feature low interference emission in the high frequency range and a low power loss. In addition, in comparison to other switching converters, this special embodiment of switching converters, a so called resonance converter, does not cause any rapid current and voltage changes and can therefore be operated at higher switching frequencies. This makes it possible, that a transformer can be used for the resonance converter which is very low in volume and weight.

In general, in resonance converters, at least the primary part of the transformer, together with a circuit capacitance, constitutes an oscillating circuit. In case when the resonance converter uses a push-pull oscillator, two switches periodically connect this oscillating circuit, to input DC voltage so that a recharging occurs periodically between the circuit capacitance and primary part.

In resonance converters, however, there is a known problem in that the resonance frequency depends not only on the inductance of the primary winding of the transformer and the circuit capacitance, but also on the secondary load. With increasing secondary power consumption, the resonance frequency increases in a resonance converters. Consequently, the resonance frequency coincides with the supplied control frequency only in a narrow load range. If the resonance converter functions outside this range, either the resonance current breaks off prematurely or the switches are heavily loaded as a result of the incorrect trigger timing. Also heavy energy losses can occur when switching over if both of the control electrodes of the switches are temporarily conductive, for example as a result of parasitic storage capacitances. In order to prevent the disadvantages mentioned, additional control means and/or protective measures such as protective diodes are required. The latter lead to additional energy losses and increase the interference emission in the high frequency range.

Various embodiments are known for the prevention of this disadvantage. For example, the reference EP 0 293 874 B 1 has disclosed a process and a circuit arrangement for status control for an oscillating circuit in a resonance converter. A costly control circuit monitors the current and/or voltage behavior in the resonance circuit by means of an inductive current-voltage converter disposed in series in relation to the primary winding and generates a triggering frequency for the switches, which is continuously modulated to the changing natural frequency. The resonance condition is maintained over a large load range.

The references EP 0 589 911 B1 and EP 0 589 912 B1 have disclosed switch regulators which contain a resonance converter with a push-pull oscillator, which is powered by a pre-regulator that is scanned with a pulse-width modulated signal. The pre-regulator decreases an intensely fluctuating input voltage and contains two individual inductances for uncoupling the feed of the input currents into the push-pull branches. With separate circuit capacitances, the two primary windings of a push-pull transmitter that are galvanically separated from each other each constitute a secondary-side resonance circuit. The circuit capacitances respectively apply regulated operating currents to the inputs for the current feed and have DC potential. Two switches alternatingly switch the primary windings of the push-pull branches in relation to ground. Between the switch changes, both of the switches are without current during a so-called gap time. In accordance with the description, the gap time should permit an oscillation of the push-pull converter including parasitic winding capacitances or capacitances of rectifiers that are not explained in detail. A control device clearly excites the switches independent of the load. The voltages that are present at the circuit capacitances and are added in a summing network, and the input current of the pre-regulator are used as control criteria for the pulse-width modulation. The input current of the pre-regulator is detected by an inductive current converter.

Inductive charging devices for mobile radiotelephones have also been disclosed. For example, the reference GB 2291 291A has disclosed a non-contacting battery charging device for supplying electric power from a charger without direct contact to an accumulator battery in a radio telephone. A charging unit comprises a primary coil, an oscillator for supplying AC power to the coil and an oscillator control section connected with means for turning on and off the power supplied to the oscillator. The radiotelephone contains circuits for generating a halt signal that halts the supply of AC power to the oscillator automatically via an optical link by an incoming call or by operating keys of the telephone keyboard. That eliminates the attractive force caused by electromagnetic induction between the radiotelephone and the charger to enable easy removal of the device from the charger. In an especially embodiment of the known solution a contact switch arranged in a depression of the charger turns the charger on when the radiotelephone is placed within the charger.

Charging devices of the prior art transmit only a low electrical charging power to the radiotelephone, which is insufficient for quick charges, although the devices contain voluminous primary and secondary windings. In addition, these known charging devices have a high-energy consumption and an intense magnetic interference emission in relation to the power transmitted.

The operating mode of a charging device with high power transmission creates a great problem for operational reliability, when the device does not switch into a low-power standby mode automatically.

Also, in the no-load state, i.e. when a charging control in the mobile device has ended the charging process, or when the mobile electrical device has been removed from the charging unit, the charging unit requires a considerable amount of power so that in continuous operation, additional measures are necessary for a continuously reliable bleeding off of power. Furthermore, foreign bodies that are electrically and/or magnetically conductive and get into the alternating field by chance, for example coins, metallic office accessories and the like, can absorb a lot of energy from the alternating field, heat up intensely due to inductively generated short circuit currents and eddy currents, and represent a danger for the surrounding area. Even a mobile telephone or another electronic device that is not equipped for inductive energy transmission can inadvertently get into the region of the alternating field and possibly even get damaged due to a continuous inductive heating. On the other hand, by shifting the resonance condition, the foreign bodies can considerably increase the power consumption of the charging device so that it is destroyed when there is insufficient heat dissipation.

Known resonance converters have expensive control circuits with additional inductive components in order to precisely control the switches in the load range from no-load to full-load. Furthermore, the known resonance converters are only insufficiently equipped with control means that permit a primary-side detection of and reaction to changes in the load by means of the secondary, e.g. the removal of the mobile electrical device after the charging of the batteries is finished.

SUMMARY OF THE INVENTION

The object of the invention is to produce a charging device of the type described before, with an extremely compact design, in which a DC converter that is constructed with simple means has minimal energy losses and minimal electromagnetic interference emission in a load range from no-load to full-load. Furthermore, in the event of no-load operation or when a foreign body influences the magnetic field, the charging unit should switch back into a low-power standby mode.

In order to attain the object, the invention is based on a charging device in which a charging unit transmits power to a mobile device using a alternating magnetic field. According to the invention, the alternating magnetic field is generated by the primary windings of a self-oscillating push-pull oscillator with separate resonance circuits in each push-pull branch. Switches are disposed in the push-pull branches, which are triggered by way of a positive feedback from the opposite push-pull branch.

In addition to the circuit capacitance, each resonance circuit contains the inductance of a primary winding W1 or W2, which when a mobile device MD is brought close, is coupled with a coupling factor k to the respectively opposite secondary winding W3 or W4, wherein preferably, the equation $0.2 \leq k \leq 0.6$ applies. According to the invention, the primary windings in the charging unit are in fact connected to a common core, but are disposed spatially separate from each other so that each generates a alternating magnetic field in a different spatial region, which can be separately influenced. A self-oscillating converter has the advantage that the timing of the switches is precisely determined by the momentary frequency value of the primary resonance circuits without expensive control means.

Caused by separate arranged primary windings, the oscillation circuits of the push-pull branches react independently of each other to unequal loads of the spatial regions of the magnetic alternating field. This has the advantage that in the circuit according to the invention, electrical operating values are present that are different in the push-pull branches, depending on the load. In particular, these values are the voltage by way of the switches and the operating current of each push-pull branch. In conjunction with these operating values, the load types in the secondary part of the alternating magnetic field, such as full-load, no-load, and incorrect load due to a foreign body, can be detected in the charging unit and corresponding measures can be automatically triggered, such as the reduction or the switching off of the energy supply.

BRIEF DESCRIPTION OF THE DRAWING

The invention is explained below in conjunction with an exemplary embodiment. In particular, the corresponding drawings show the following.

BEST MODE FOR CARRYING OUT THE INVENTION

Figure 1:
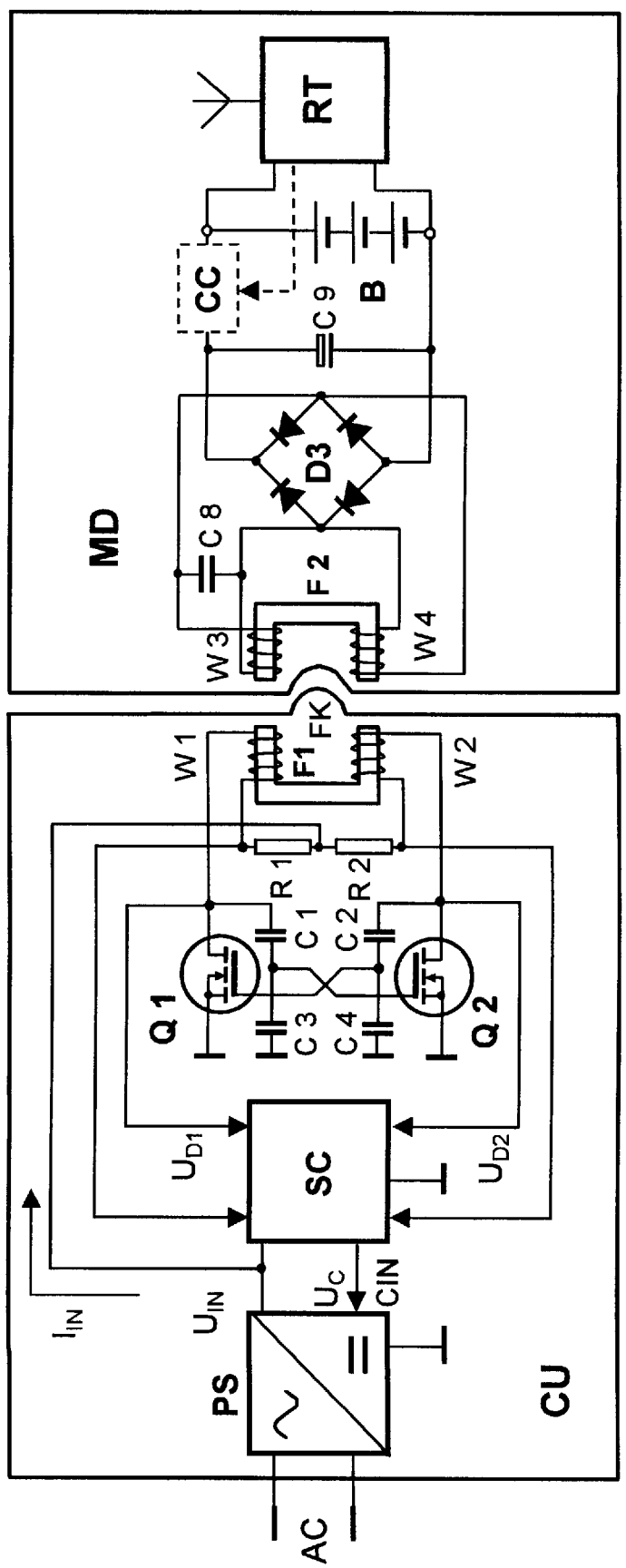
FIG. 1 shows the principle for transmitting charging power according to the invention from a charging unit to a mobile electrical device.

FIG. 1 shows a charging unit CU for charging an accumulator battery B in a mobile electrical device MD, which in the current example is a mobile telephone. In the charging unit CU, a power supply PS supplies an input DC voltage $U_{IN}$ for a push-pull oscillator with each series circuit comprised of a primary winding W1 or W2 and switches Q1 or Q2 in the push-pull branches. A control circuit SC, which on the one hand, evaluates the voltages $U_{D1}$, $U_{D2}$ by way of the switches Q1, Q2 and on the other hand, evaluates voltage drops at impedances R1, R2 in each of the push-pull branches depending on operating current $I_{IN}$, generates a control voltage $U_c$ for a control input terminal CIN of the power supply PS.

For a public network-operated charging unit CU, for example, the power supply PS is a conventional AC/DC switching converter, which converts the public network voltage AC into an input DC voltage $U_{IN}$ and has an control input terminal CIN for switching off the input DC voltage $U_{IN}$. The input CIN is advantageously disposed in a conventional circuit for controlling the switching converter.

If the charging unit CU is provided for use in a motor vehicle, then the AC/DC switching converter is replaced by a simple electronic on/off switch for interrupting the operating current supply.

According to another embodiment of the invention, the control voltage $U_c$ can also be used for muting the push-pull oscillator.

The primary windings W1, W2 generate the alternating magnetic field required for the energy transmission and are advantageously connected to the arm ends of a U-shaped ferrite core F1, which is disposed close beneath the surface of the housing of the charging unit CU.

In addition to the conventional mobile telephone part RT and the accumulator battery B, for each push-pull branch, a secondary winding W3 or W4 is contained in the housing of the mobile device MD, and in the example, these secondary windings W3, W4 are disposed parallel to an additional circuit capacitance C8 and with it, form a secondary resonance circuit. The secondary windings W3, W4, however, can also be connected in series. In the interests of a maximal energy transmission to the mobile device MD, the resonance frequency of the resonance circuit C8, W3, W4 should be close to the oscillating frequency of the push-pull oscillator. As a result, when there is a high coupling factor k, the secondary-side resonance has only a slight influence on the power transmission. In this case, it is advantageous to optimize the circuit capacitance C8 with regard to the suppression of RF interferences that are produced at the rectifier D3.

In the other case, it is advantageous for the avoidance of a high secondary no-load voltage, to select the value of the circuit capacitance C8 lower than is needed for the resonance condition. As a result, on the secondary side, on the one hand, a voltage limitation is produced at low load, while when there is high load and in the event of a short circuit, current limitation takes place in connection with the coupling mentioned.

The secondary windings W3, W4, analogous to the primary windings W1, W2, are advantageously disposed on the arm ends of a second U-shaped ferrite core F2, which is disposed close beneath the surface of the housing of the mobile device MD. It is important for the function of the charging device that the secondary windings W3, W4 evenly load the primary windings W1, W2. An average coupling factor k of up to approximately 0.40, together with the data of the resonance circuit C8, W3, W4, permits a favorable secondary-side current limitation so that no power has to be converted for this in the mobile device MD.

In order to enable a correct approach of the mobile device MD toward the charging unit CU and thus an optimal magnetic coupling, the housing of the charging unit CU has a mechanical guide FK and/or mount, which is adapted to the shape of the mobile device MD.

The arrangement of windings on the arm ends of U-shaped ferrite cores F1, F2 on the one hand has the advantage that for the effective power transmission, the rear magnetic fluxes of the primary windings W1, W2 and the secondary windings W3, W4 are closed. As a result, the U-shaped ferrite cores make an extremely flat design of a mobile telephone possible. On the other hand, the local separation of the primary windings W1, W2 requires that only a mobile device MD, which has a corresponding resonance circuit C8, W3, W4 with secondary windings W3, W4 in the same arrangement as the charging unit CU, can draw the full energy quantity from the alternating field. In the other case, the resonance conditions of the circuits in the push-pull branches change on the secondary side, which has an influence on the voltage by way of the switches and the operating current of each push-pull branch.

The coupling of the load to the secondary-side resonance circuit C8, W3, W4 is carried out by way of a charging rectifier D3, in this case a bridge rectifier. By way of a charging capacitor C9, this charging rectifier D3 supplies the charging output voltage $U_{OUT}$ for the accumulator battery B. A charging control circuit CC can be connected between the charging rectifier D3 and the accumulator battery B, and this control circuit CC interrupts the power supply to the accumulator battery B when it is fully charged. In this way, the push-pull oscillator is switched from full-load operation into no-load operation even without removal of the mobile device MD.

The circuitry of the DC converter is based on an intrinsically known self-oscillating push-pull oscillator, in which in the current example, the switches Q1, Q2 are connected with positive feedback by way of capacitive voltage dividers C1, C3 or C2, C4 from the opposite push-pull branch.

Figure 2B:
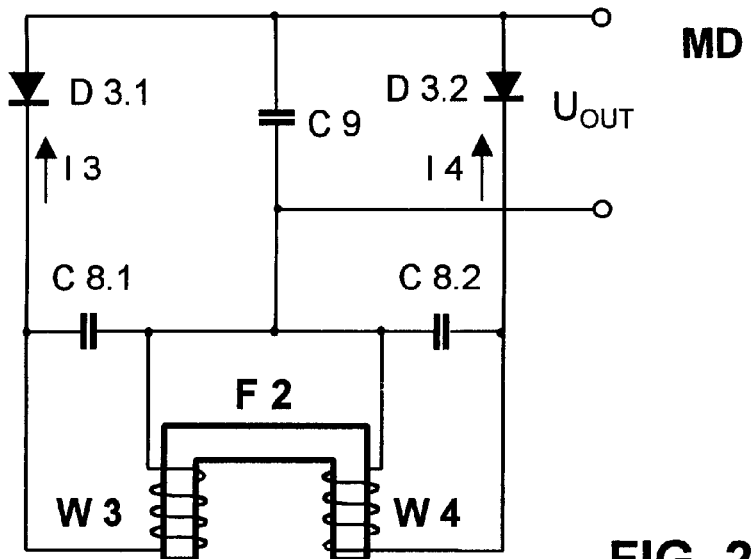
FIG. 2b shows a preferred embodiment of the secondary circuitry of the resonance converter in the mobile electrical device.
Figure 2A:
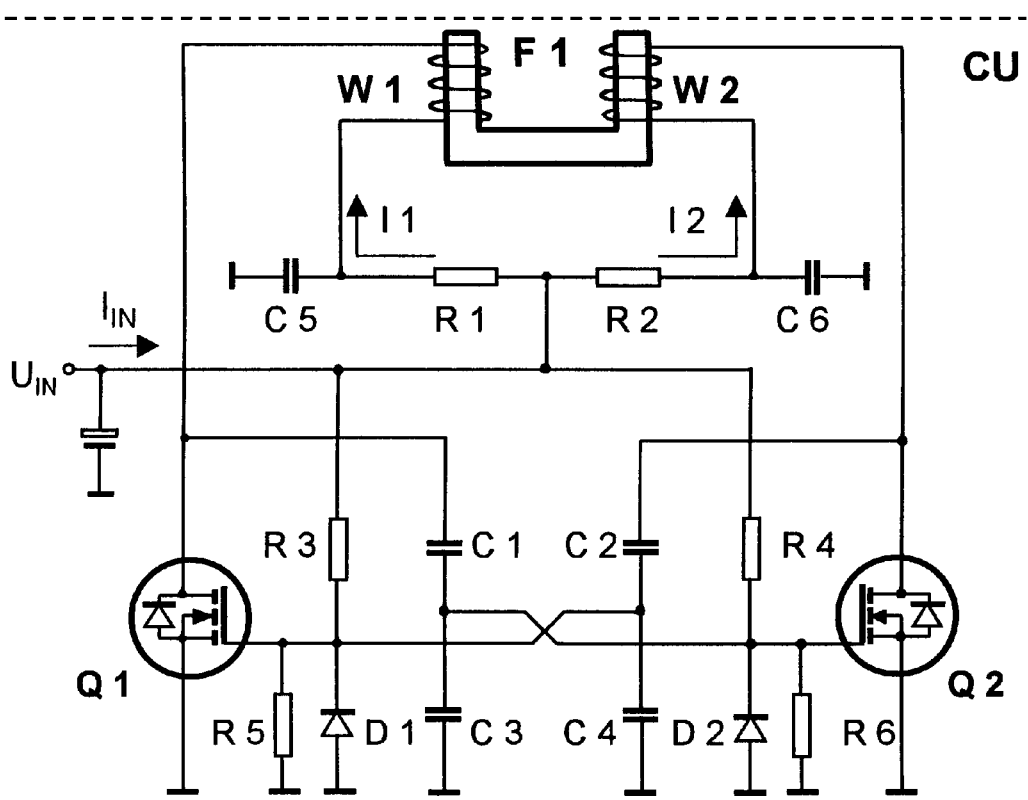
FIG. 2a shows the primary circuitry of the resonance converter in the charging unit.

FIG. 2a shows the circuit of the push-pull oscillator. Basically, the positive feedback can also occur inductively, for example by means of a coupling winding being attached to each of the arm ends of the opposite push-pull branch. In contrast to known self-oscillating push-pull oscillators with a parallel oscillation circuit comprised of a circuit capacitance and a circuit inductance with a center tap, the push-pull oscillator used in the invention contains two separate series oscillating circuits W1, C1, C3 and W2, C2, C4 disposed parallel to the input DC voltage $U_{IN}$. The circuit capacitances of the push-pull branches are each embodied as capacitive voltage dividers or C2, C4, and are disposed parallel to the switch Q1 or Q2. The circuit inductance is disposed in series with this, and, due to the large air gap, is predominantly constituted by the inductance of the primary winding W1 or W2. The impedances R1 and R2, which advantageously are ohmic resistances with resistance values of up to several ohms, are disposed in series to the primary winding W1 or W2, in the present case at the input DC voltage $U_{IN}$. In order to filter and in particular to discharge the power supply PS of high frequency currents, these ohmic resistances are connected to the capacitors C5 and C6, whose capacitance is much larger than the effective capacitance of the capacitive voltage divider C1, C3, or C2, C4 and these capacitors therefore have only a very slight influence on the resonance behavior of the primary resonance circuits.

In the current example, the switches Q1, Q2 are MOSFETs of the enhancement type, which require a gate-source threshold voltage of approximately 4V in order to switch on. As a result, the operating points in the switches Q1, Q2 can be adjusted in a simple manner, namely by means of dimensioning the capacitive voltage dividers C1, C3 or C2, C4 and the resistances R3 to R6, so that after a switch is turned off, a voltage $U_{D1}$, $U_{D2}$ must first be built up by the circuit inductance because of this turning off of the switch, before the opposite switch turns on. In other words, after the opening of a first switch, the second closes only if the voltage at the output of the capacitive voltage divider, by way of the first switch, exceeds the gate-source threshold voltage.

As a result, in all load cases, it is reliably prevented that when switching over, both switches are conductive.

On the other side, each switch remains closed as long as the voltage at the output of the capacitive voltage divider from the other push-pull branch exceeds the gate-source threshold voltage. If, for example due to an increase in the load on the secondary side and the resultant increase in the resonance frequency, the recharging times are shortened at the open switch, then the other remains closed for a correspondingly shorter time. In this manner, even when there are uneven loads on the primary windings W1, W2, the switching times of the switches always remain exactly adjusted as a function of the load conditions.

This is particularly important since in relation to resonance converters with conventional transmitters, greater frequency changes occur. If the mobile device MD is completely removed, then the resonance frequency is at its highest, since the influence from the secondary part of the magnetic circuit is not there. The resonance frequency is at its lowest when the mobile device MD is coupled and the accumulator battery B is charged. When the accumulator battery B is not charged, the resonance frequency lies between these.

The resistances R3 and R4 support a reliable oscillation of the oscillating circuit and can also be omitted in actual use, if the power supply PS has a low intrinsic impedance and when there is a corresponding dimensioning of the circuit components so that a rapid charging of the capacitive voltage divider C1, C3 or C2, C4 occurs.

Since the self-oscillating push-pull oscillator in no way requires additional drivers for controlling the switches Q1, Q2 and the parasitic capacitances, in particular the relatively large gate-source capacitance of the switches Q1, Q2, are disposed parallel to the capacitors C1, C3 and C2, C4 of the circuit capacitances, these can be recharged without resistive losses in comparison to known embodiments in which a control is carried out by ohmic resistances.

The push-pull oscillator therefore has only a very low internal loss and can easily transmit a high frequency power of several Watts with a switching frequency of over 500 kHz in order to charge the mobile device MD.

FIG. 2b shows a preferred embodiment of the secondary-side circuitry in the mobile electrical device. In Contrast to the embodiment of the first secondary-side circuitry shown in FIG. 1 the secondary-side winding W3, W4 are connected in series. Each of the windings W3, W4 is disposed parallel to an own circuit capacitance C8.1 or C8.2 and forms a separate secondary resonance circuit. The resonance frequency of both resonance circuits C8.1, W3 and C8.2, W4 should be close to the oscillating frequency of the push-pull oscillator at least when the charger operates in full-load mode. Each resonance circuit C8.1, W3 or C8.2 W4 is connected separately with a charging rectifier diode D3.1 or D3.2 to create a known two-way rectification.

The conducting directions of the charging rectifier diodes D3.1 and D3.2 are arranged in such a manner that only that rectifier diode D3.1 and D3.2 carries forward current I3 or I4 momentary via the corresponding secondary winding W3 or W4 which is arranged opposite to that primary winding W1 or W2 that has left the conducting state a short period before. That means for instance, when switch Q1 is switched on and primary winding W1 carries switching current I 1 than rectifier diode D3.1 is blocked. But when switch Q1 blocks, the energy of the magnetic field is transformed into electric energy and charges the primary circuit capacitances C1, C3 and the secondary circuit capacitance C8.1. When the voltage amplitude across secondary circuit capacitance C8.1 exceeds the voltage across charging capacitor C9, than rectifier diode D3.1 carries forward current I3 through secondary winding W3 to charge the charging capacitor 9. A short period after Q1 is switched on and switch Q2 is switched off, the secondary winding W4 conducts. The preferred embodiment of the secondary-side circuitry results on the one hand more concentrating of the magnetic flux between the primary winding W1 or W2 and the corresponding secondary winding W3, W4 conducting current momentary. On the other hand, those opposite windings, which do not carry any current momentary, do not dump the resonance of both resonance circuits transmitting the power. The coupling factor between the primary winding and the secondary winding increases.

The embodiment according FIG. 2b causes an enhancing of efficiency of power transmission to the mobile device and a better stability of the output voltage depending on the secondary load. The solution shows the best transmission efficiency when the resonance frequency of both resonance circuits C8.1, W3 and C8.2, W4 is close to the oscillating frequency of the push-pull oscillator at least when the charger operates in full-load mode.

Figure 3:
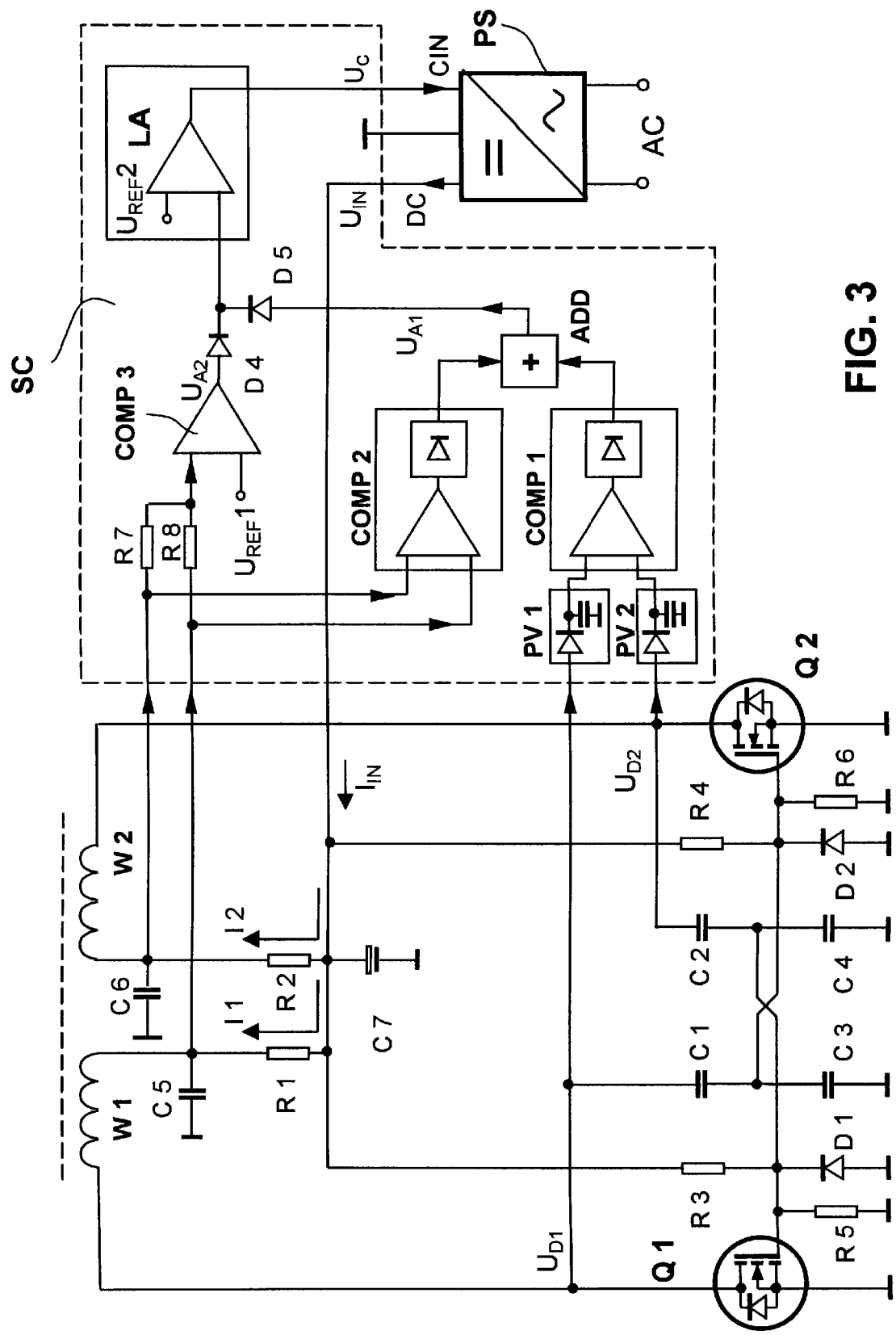
FIG. 3 shows the primary circuitry of the resonance converter in the charging unit connected to a control circuit for detecting no-load operation and uneven loads of the alternating magnetic field.

FIG. 3 shows another particularly advantageous embodiment of the invention. According to the design of the invention, the primary circuit of the resonance converter in the charging unit CU is connected to the control circuits SC. This control circuit is intended to detect from the load whether either the mobile device MD is not coupled or the mobile device MD is coupled and the accumulator battery B is charged or an uneven loading of the alternating magnetic field exists by means of foreign bodies. It is thereby assumed that foreign bodies generally influence the spatial regions of the primary windings W1, W2 unevenly. The surface of the charging unit CU can be correspondingly shaped to realize this. An uneven influence brings on the one hand, the duration of the recharging times at the respectively open switches Q1, Q2 out of equilibrium. In this case, the amplitudes of the voltages UD1, UD2 at the open switches Q1, Q2 are unequal. On the other hand, differences in the power drawn from the primary resonance circuits also induce assessable deviations of the operating currents I1, I2 in the push-pull branches.

Figure 4:
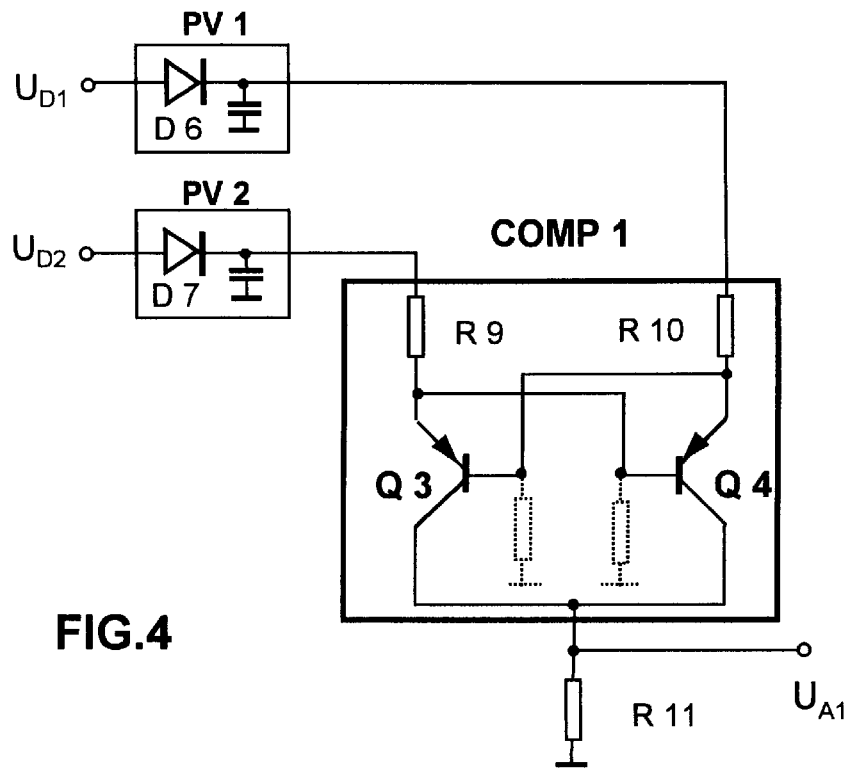
FIG. 4 shows an exemplary embodiment for a first comparator for detecting uneven load of the primary resonance circuits in the charging unit.

Consequently, the control circuit SC contains a comparator COMP 1 for comparing peak voltage values of the switching voltages $U_{D1}$, $U_{D2}$. Since the switching voltages $U_{D1}$, $U_{D2}$ occur in the push-pull mode, a comparison is only possible if the level peaks are kept by peak value formers PV1, PV2 or similar storage devices. The comparator COMP 1 is a differential amplifier whose output circuit is embodied so that the comparison result always appears as an absolute value. This is achieved, for example, with a circuit shown in FIG. 4. The peak value formers PV1, PV2 contain charge capacitors that are charged by way of diodes D6, D7. As a result of the induction voltage, the peak values are above the input DC voltage $U_{IN}$, at approximately 40V in the present example. The comparison is executed with the transistors Q3, Q4, which along with the emitter resistances R9, R10 and the joint collector resistance R11, constitute a differential amplifier which generates a DC voltage $U_{A1}$ at the collector resistance R11 when there is an inequality of the peak values. In order to prevent overvoltages at the transistor electrodes, the emitter resistances R9, R10 can be embodied as base voltage dividers with additional resistances that are depicted with dashed lines. The transistors Q3, Q4 are connected crosswise with negative feedback so that both transistors are blocked and the output voltage $U_{A1}=0$ if the peak values are equal or differ only slightly from each other. However, if the peak values are unequal, which occurs when there is an unequal load as a result of a foreign body against the primary coils W1, W2, then one of the transistors Q3, Q4 becomes conductive and at the collector resistance 11, the output voltage $U_{A1}$ is greater than 0. If the output voltage $U_{A1}$ exceeds a reference value $U_{REF}2$, then a self-holding toggle switch LA that is connected by way of a decoupling diode D5 closes. This switches off the input DC voltage $U_{IN}$ for a blocking period T1 by means of the input CIN to the power supply PS.

After the blocking period T1 expires, which depends on the energy reserve of the blocking switch LA, which stores an internal capacitance, the switch LA opens and the power supply PS switches the input DC voltage $U_{IN}$ back on. As a result, the push-pull oscillator begins to oscillate.

If the inequality of the load has not been neutralized in the meantime, then the comparator COMP 1 once again generates an output voltage $U_{A1}>0$ and the input CIN once again switches off the input DC voltage $U_{IN}$ after an interval T2.

If the control circuit is dimensioned in such a way that T1>T2, then a low-power standby mode can be realized using simple means.

Figure 5:
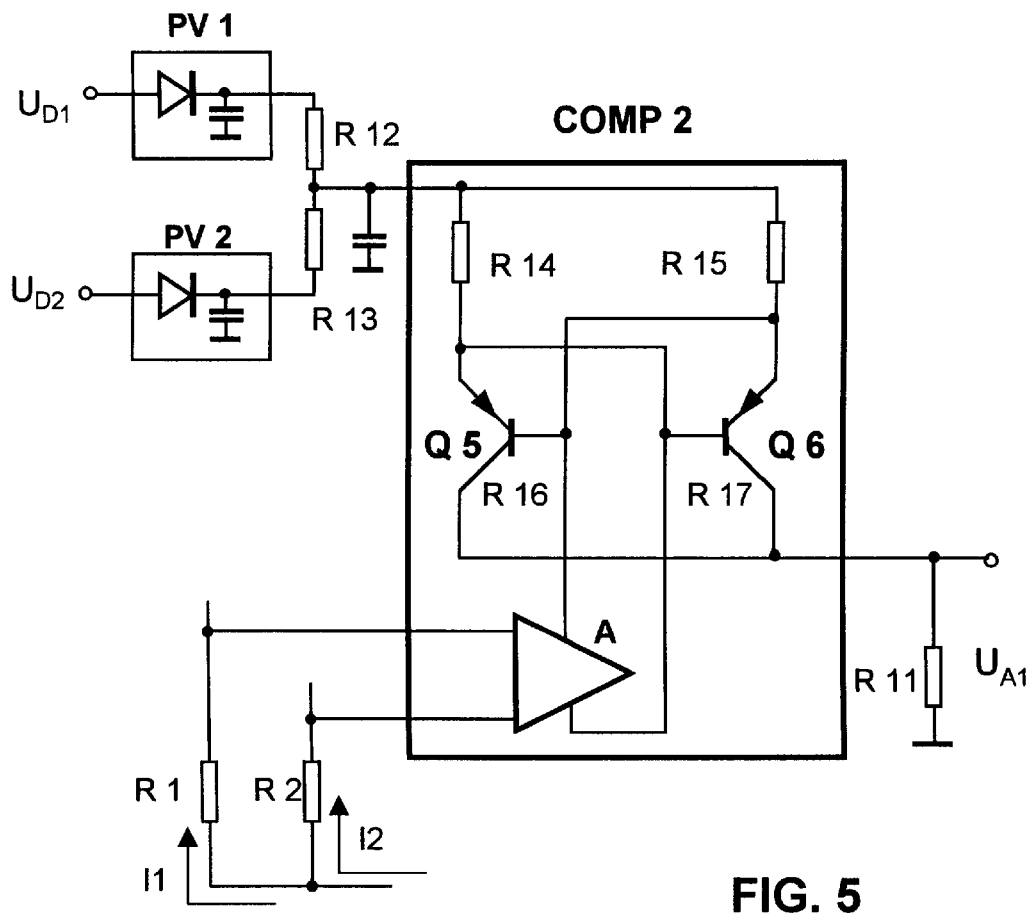
FIG. 5 shows an exemplary embodiment for a second comparator for detecting an uneven load of the primary resonance circuits in the charging unit.

The control circuit SC has a comparator COMP 2 for evaluating differences in the power draw. As shown in FIG. 3, this measures the voltages that the operating currents I1, I2 of the push-pull branches produce across the impedances R1, R2 and is likewise a differential amplifier. The output circuit is also embodied so that the comparison result always appears as an absolute value. FIG. 5 shows a possible embodiment for the comparator. The circuitry is similar to that in FIG. 4. In contrast to the comparator COMP 1, in addition to the differential stage described, which has the transistors Q5, Q6 and the emitter resistances R14, R15, there is an additional differential amplifier stage A for adapting the comparator inputs to the voltages at the impedances R1, R2.

Advantageously, the relatively high voltage at the peak value formers PV1, PV2 is averaged with resistances R12, R13 and a charging capacitor and is used by the comparator COMP 2 as an operating voltage for the differential stages Q5, Q6. The output from the comparator COMP 2 is connected to the collector resistance R11 like that of COMP 1. As a result, in the exemplary embodiment, the signal adder ADD shown in FIG. 3 is realized. The signal adder ADD effects that the output voltage $U_{A1}$ is a function of inequalities both of the switching voltages $U_{D1}$, $U_{D2}$ and of the operating currents I1, I2.

In order to detect the no-load operation, only the operating currents I1, I2 are evaluated since they have a minimum in no-load operation. The resistances R7 and R8, with a capacitance, not shown, generate the average of the voltage drops at the impedances R1, R2. A known comparator COMP3 compares this average to a reference voltage $U_{REF}1$ and generates an output voltage $U_{A2}>0$ that switches the push-pull oscillator back into the low-power standby mode when the operating currents I1, I2 lie below a minimum value due to a no-load or low-load operation. At periodic time intervals T1, a test is carried out as to whether an even loading of the primary windings occurred in the meantime.

I claim:

1. A device for charging batteries in a mobile electrical device (MD) containing a charging unit (CU) which inductively transmits electrical power by means of a alternating magnetic field from at least two primary windings (W1, W2) to at least two secondary windings (W3, W4) in the mobile device (MD), characterized in that the alternating magnetic field is generated by a self-oscillating push-pull oscillator with two branches, wherein the push-pull oscillator contains switches (Q1, Q2) that are reciprocally connected with positive feedback and in each push-pull branch, contains a resonance circuit with the effective inductance of at least one primary winding (W1, W2) and with a circuit capacitance (C1, C3 or C2, C4), wherein the at least two primary windings (W1 and W2) in the charging unit (CU) are disposed spatially separate from each other so that each generates an alternating magnetic field in a different spatial region and the secondary windings (W3, W4) are disposed in the mobile device so that each spatial region is equally loaded.

2. The device according to claim 1, characterized in that the switches (Q1, Q2) are respectively connected with positive feedback by way of the circuit capacitance of the opposing push-pull branch, which capacitance is embodied as a capacitive voltage divider (C1, C3 or C2, C4).

3. The device according to claim 1, characterized in that in order to detect a no-load operation of the charging unit (CU), impedances (R1, R2) are contained in the push-pull branches in which control voltages for control means (R7, R8, COMP 3, LA) drop as a function of the power transmitted, and these control means set at least the push-pull oscillator into a low-power standby mode when the average of the control voltages, which correspond to operating currents (I1, I2) in the push-pull branches of the push-pull oscillator, is below a minimum value ($U_{REF}$).

4. The device according to claim 1, characterized in that in order to detect uneven loads of the magnetic field by means of foreign bodies, a control circuit (SC) detects inequalities in electrical operating values (I1, I2, $U_{D1}$, $U_{D2}$) in the push-pull branches and switches at least the push-pull oscillator into a low-power standby mode.

5. The device according to claim 4, characterized in that peak voltage values, which are formed by peak value formers (PV1, PV2) from the switching voltages ($U_{D1}$, $U_{D2}$) across the switches (Q1, Q2), are compared with one another by a first comparator (COMP 1) and that the control circuit (SC) switches at least the push-pull oscillator into the low-power standby mode as long as there is an inequality in the peak values.

6. The device according to claim 4, characterized in that a second comparator (COMP2) compares the voltage drops caused by the operating currents (I1, I2) at the impedances (R1, R2) and that the control circuit (SC) switches at least the push-pull oscillator into the low-power standby mode as long as there is an inequality.

7. The device according to claim 4, characterized in that the surfaces of the charging unit (CU) and the mobile device (MD) are shaped in the region of the alternating magnetic field so that only a correspondingly shaped mobile device (MD) that has come close to the charging unit (CU) evenly loads both spatial regions of the alternating magnetic field.

8. The device according to claim 4, characterized in that the low-power standby mode is adjusted by means of a pulsed supply of the operating current ($I_{IN}$=I1+I2) and/or input DC voltage ($U_{IN}$) at least to the push-pull oscillator.

9. The device according to claim 4, characterized in that the low-power standby mode is adjusted by means of a muting of the push-pull oscillator.

10. The device according to claim 8, characterized in that during the no-load and/or low-load operation of the push-pull oscillator or when a foreign body uneven loads the alternating magnetic field, a self-holding toggle switch (LA) produces the pulsed supply of the operating current ($I_{IN}=$ I1+I2) at least to the push-pull oscillator so that this oscillator is periodically switched on for a period of time (T2) in order to check a coupling of the mobile electric device (MD) for the drawing of charging energy.

11. A mobile electrical device (MD) for inductive coupling to a charging unit having at least two primary windings (W1 and W2) which are disposed spatially separate from each other, the mobile electrical device (MD) containing two secondary windings (W3 and W4) for inductively receiving electrical power via means of the alternating magnetic field from said primary windings (W1 and W2) characterized in that the secondary windings (W3 and W4) are disposed spatially separate from each other and each of the secondary windings is disposed parallel to a separate circuit capacitance (C8.1 or C8.2) and forms a separate secondary resonance circuit wherein each secondary resonance circuit (C8.1, W3 or C8.2, W4) is connected separately with a charging rectifier diode (D3.1 or D3.2) to create a known two-way rectification.

12. The mobile electrical device (MD) according to claim 11, characterized in that the conducting directions of the charging rectifier diodes (D3.1 and D3.2) are arranged in such a manner that only that rectifier diode (D3.1 and D3.2) carries forward current I3 or I4 momentary via the corresponding secondary winding (W3 or W4) which is arranged opposite to that primary winding (W1 or W2) that has left the conducting state a short period before.

13. The device according to claim 3, characterized in that a second comparator (COMP2) compares the voltage drops caused by the operating currents (I1, I2) at the impedances (R1, R2) and that the control circuit (SC) switches at least the push-pull oscillator into the low-power standby mode as long as there is an inequality.

14. The device according to claim 3, characterized in that the low-power standby mode is adjusted by means of a pulsed supply of the operating current ($I_{IN}$=I1+I2) and/or input DC voltage ($U_{IN}$) at least to the push-pull oscillator.

15. The device according to claim 3, characterized in that the low-power standby mode is adjusted by means of a muting of the push-pull oscillator.

* * * * *